United States Patent [19]
Toda et al.

[11] Patent Number: 5,450,390
[45] Date of Patent: Sep. 12, 1995

[54] METHOD AND APPARATUS FOR WRITING AND READING INFORMATION AND STORAGE MEDIUM USED FOR THE SAME

[75] Inventors: Tsuyoshi Toda, Kodaira; Atsushi Saito, Ichikawa, both of Japan

[73] Assignee: Hitachi, Ltd., Tokyo, Japan

[21] Appl. No.: 928,037

[22] Filed: Aug. 11, 1992

[30] Foreign Application Priority Data

Aug. 13, 1991 [JP] Japan .................. 3-202715
Oct. 21, 1991 [JP] Japan .................. 3-272439

[51] Int. Cl.$^6$ ............................................. G11B 7/095
[52] U.S. Cl. ................................ 369/121; 369/44.27
[58] Field of Search ............... 369/121, 122, 44.27, 369/44.37

[56] References Cited

U.S. PATENT DOCUMENTS

| | | | |
|---|---|---|---|
| 3,164,685 | 1/1965 | Banning, Jr. et al. | 179/100.11 |
| 3,443,109 | 5/1969 | Broom et al. | 250/217 |
| 4,517,667 | 5/1985 | Sprague | 369/122 |
| 4,689,781 | 8/1987 | Ando | 369/112 |
| 4,769,804 | 9/1988 | Satoh et al. | 369/58 |
| 4,829,497 | 5/1989 | Sako et al. | 369/50 |
| 4,935,913 | 6/1990 | Shinda | 369/54 |
| 4,998,234 | 3/1991 | Rees et al. | 369/44.27 |
| 5,267,226 | 11/1993 | Matsuoka et al. | 369/44.11 |

FOREIGN PATENT DOCUMENTS

58-146039  8/1983  Japan .

Primary Examiner—Paul M. Dzierzynski
Assistant Examiner—David Vernon Bruce
Attorney, Agent, or Firm—Fay, Sharpe, Beall, Fagan, Minnich & McKee

[57] ABSTRACT

Light spots are irradiated onto an optical disk and are detected as signals. A selection is made to receive as an input one of the detected signals from the light spots. The use of two light spots in a signal processing system permits writing information with one light spot and then reading it with the other to confirm the write state or erase state of the information.

17 Claims, 6 Drawing Sheets

METHOD AND APPARATUS FOR WRITING AND READING INFORMATION AND STORAGE MEDIUM USED FOR THE SAME

BACKGROUND OF THE INVENTION

The present invention relates to a method for writing and reading information on to and out of a storage medium, and more particularly to a method for writing and reading information suitable for controlling a read signal, an apparatus for writing and reading information using that method and a storage medium suitable for the use therefore.

Figure 6:
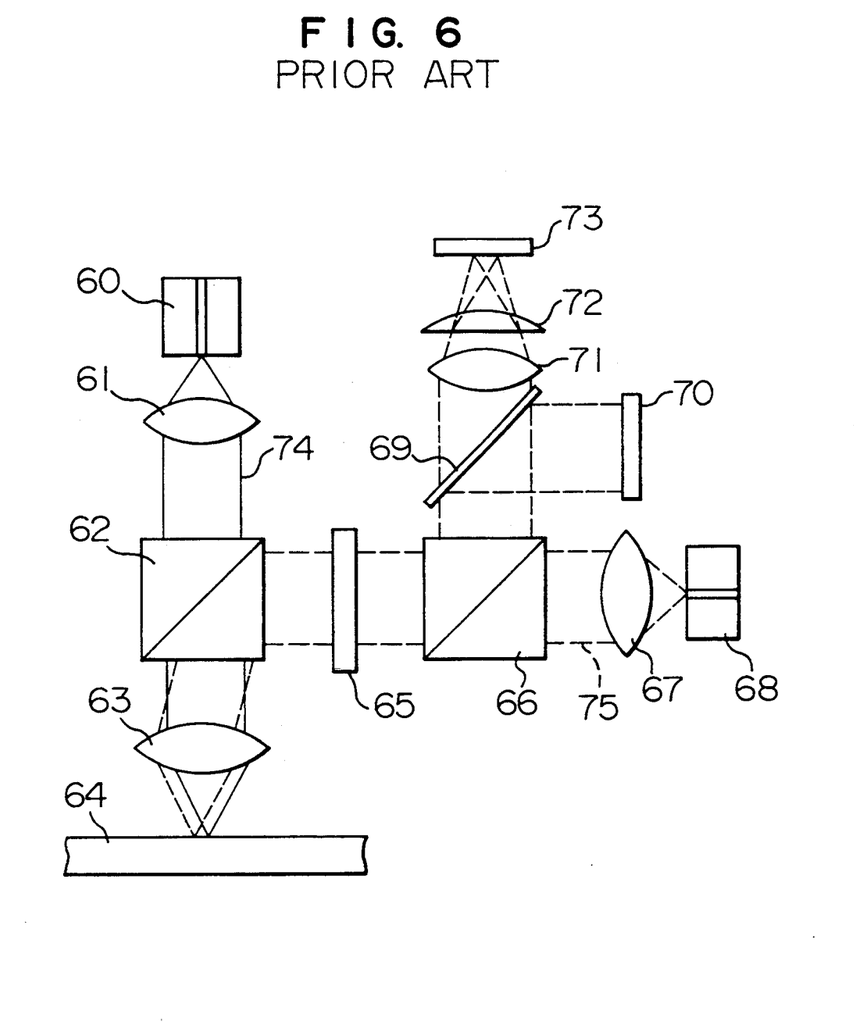
FIG. 6 is a block diagram of a conventional apparatus for writing and reading.

For example, in JP-A-58-146039, an optical head for confirming that information has been written by reading the stored information immediately after the information is written on a storage medium for the purpose of detecting a defect on the storage medium in its early stages is disclosed. The structure thereof is shown in FIG. 6. The optical head of the apparatus shown in FIG. 6 includes a light source 60 for writing and a light source 68 for reading to confirm the writing. When information is written, a luminous flux 74 from the light source 60 for writing forms a writing spot with an objective lens 63, which is irradiated on to a medium 64. A luminous flux 75 from the light source 68 also forms a spot for confirmation with the objective lens 63, which is irradiated onto the medium 64. The reading spot for confirmation is positioned in the rear of the writing spot with respect to an onward direction. Namely, it is arranged for the purpose of confirming the information written by the writing spot by reading reflected light from the reading spot for confirmation to a signal detector 73 and reading the information.

The above-described prior art discloses a structure of a writing-reading head, however, no disclosure has been made on the structure and the method for processing signals for converting a signal obtained by the signal detector 73 into information and positional dislocation of the light spot for writing and reading.

SUMMARY OF THE INVENTION

It is an object of the present invention to control a plurality of read signals and to miniaturize an apparatus for writing and reading information and improve reliability thereof in a two-beam apparatus for writing and reading information for confirming a storage state of information by irradiating a reading spot immediately after writing the information.

It is another object of the present invention to improve a transfer speed of information and also to provide an inexpensive apparatus for writing and reading.

In order to achieve the above-described object, there is provided an apparatus for writing and reading information by irradiating a plurality of light spots on to a storage medium, which is provided with an optical head for forming the above-described plurality of light spots and reading means for reading information by receiving a plurality of detected signals obtained corresponding to each of the above-described plurality of light spots and selecting any of the detected signals so as to read information, and in which written information is read immediately after writing on the storage medium so as to confirm the storage of information by arranging the above-described light spots adjacent to one another in front and in the rear with respect to an onward direction of the storage medium. The above-described reading means has selecting means for selecting any one of the plurality of inputted detected signals, and when information is written in a storage area on the storage medium using one light spot, performs reading for confirming the storage of the information almost simultaneously with writing based on the detected signal obtained by irradiating the other light spot onto the information immediately after the information is written. In such a manner, a processing system for converting received signals into information is provided which is smaller in number than a plurality of writing-reading means.

Further, in order to realize the reading of information by signal reading means smaller in number than the above-described plurality of light spots, means for making a decision for selecting a signal to be applied with read processing out of a plurality of detected signals is provided, and means for selecting any of the plurality of detected signals in accordance with the decision so as to read the information is also included.

Furthermore, in order to perform various processes such as a writing process, a reading process and a waiting process (a process in which writing and reading of information is not performed, but wherein processes can be realized quickly) efficiently, there are provided means for forming a plurality of light spots so as to output a plurality of detected signals, means for converting the above-described plurality of detected signals into information, means for making a decision for selecting any of the detected signals among the plurality of detected signals, and means for selecting a plurality of detected signals in accordance with the decision. The above-described various processes are performed by means of a control signal for controlling the means for forming the above-described plurality of light spots and the means for selecting any of the above-described detected signals.

In the writing process, it is confirmed that the information has been written after the process of writing information on the storage medium. The confirmation is performed by reading the written information. The reading spot for is arranged in the rear with respect to the onward direction of the writing spot which writes the information. It is confirmed that the information has been written based on the reading signal obtained from reflected light of this reading spot. In the writing process, two signals, one being based on the reflected light of the writing spot and another being based on the reading spot for confirming that the information has been written are obtained. It is not required to provide means for processing a signal for these two signals, respectively. Two signals are inputted to one signal processing means, where either one of these signals is processed. As a result, it is not required to provide a processing system for converting a signal obtained based on the reflected light from the storage medium for respective signals. Thus, the reading of information becomes possible by means of the above-described processing systems which is smaller than that provided in a conventional apparatus.

In the reading process, information is read by using the reflected light from the above-described writing spot or reading spot in order to successively read data which have been written in advance on the storage medium. Further, it is also possible to read information by utilizing signals corresponding to the writing spot or the reading spot alternately.

The waiting process it is controlled so that two light spots are arranged exactly on the storage medium. For example, the process may be performed to signal control at the time of the reading process. Further, in case there is a difference in physical abrasion and consumption, degradation of performance and the like in components used the time of reading in the confirming process, it is possible to control the writing or reading processes so as to reduce the burden of a component in which degradation is advanced fast.

BRIEF DESCRIPTION OF THE DRAWINGS

FIG. 3b is an enlarged view of a portion of FIG. 3a;

DESCRIPTION OF THE PREFERRED EMBODIMENTS

Figure 1:
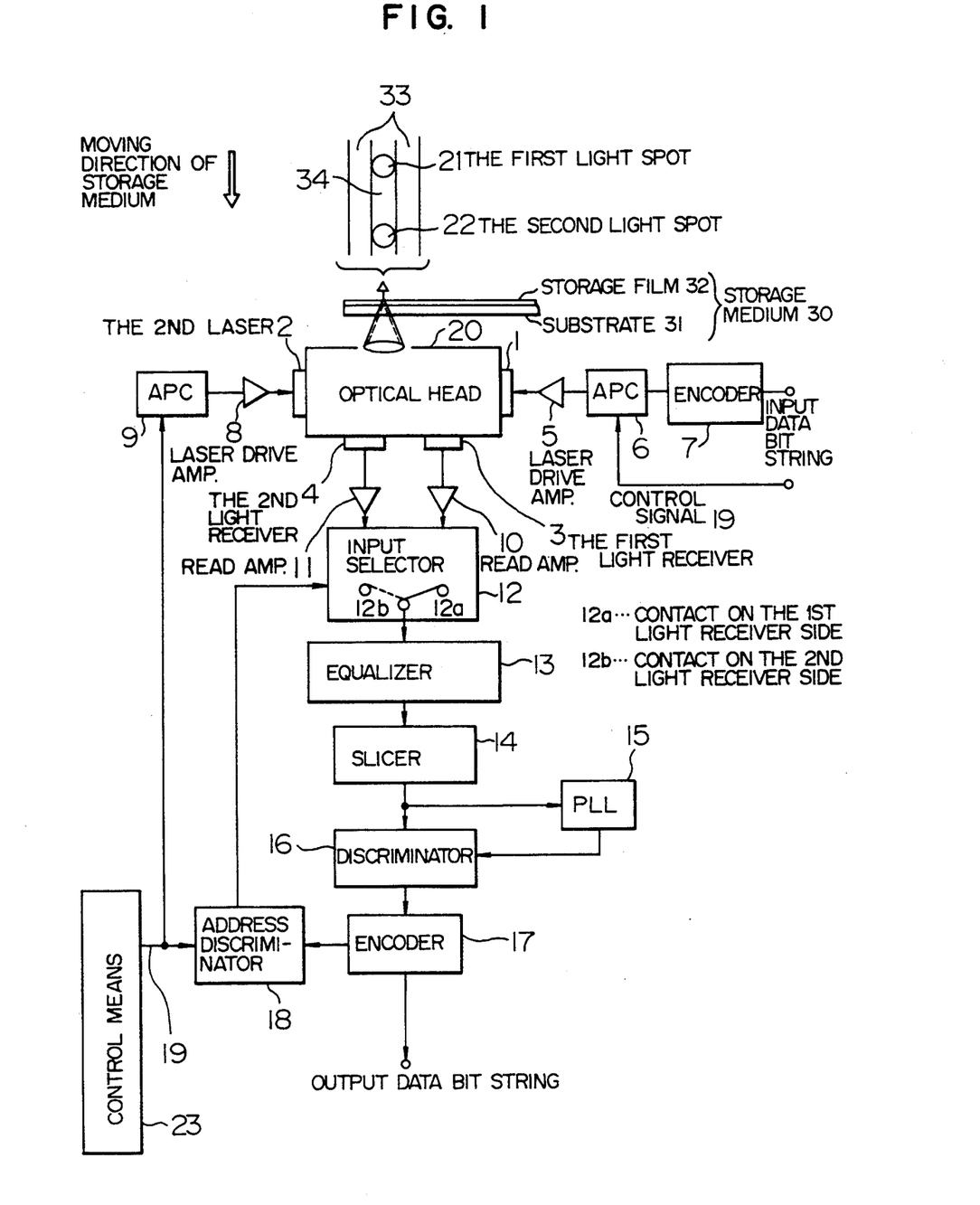
FIG. 1 is a block diagram of an apparatus for explaining an embodiment of the present invention.

The present invention will be described hereinafter with reference to an embodiment. FIG. 1 shows an example of a block diagram of an apparatus of the present invention.

A storage medium 30 consists of at least a substrate 31 and a storage film 32. On the storage film 32 are provided grooves 33 and land sections 34 among grooves, and a writing pit is written on the land sections 34 in the present embodiment.

Two light spots are irradiated on the storage medium 30 by means of an optical head 20. One light spot is a first light spot 21 for writing information on the storage medium 30 by varying mainly physical characteristics of the storage film 32. The other light spot is a second light spot adjacent to the first light spot. The second light spot 22 is always positioned rearwardly on the moving storage medium 30 with respect to the first light spot 21. A laser beam emitted from a first laser 1 provided on the optical head 20 is irradiated onto the storage medium 30 as the first light spot 21, and the reflected light thereof is received by a first light receiver 3 and converted into an electric signal. Further, a laser beam emitted from a second laser 2 provided on the optical head 20 is irradiated onto the storage medium as the second light spot 22, and the reflected light thereof is received by a second light receiver 4 and converted into an electric signal.

The electric signal converted by the first light receiver 3 is inputted to a read amplifier 10, and the electric signal converted by the second light receiver 4 is inputted to a read amplifier 11. The outputs of the read amplifiers 10 and 11 are inputted to terminals 12a and 12b of an input selector 12, respectively. The input selector 12 selects either one of the signals at the terminal 12a or 12b and outputs it to a signal processing system. First, the output of the input selector 12 is inputted to an equalizer 13. The output of the equalizer 13 is converted into a pulse signal indicating the existence of a signal by means of a slicer 14. In the present embodiment, the electric signal from the read amplifier 10 or 11 is selected by the input selector 12 and inputted to the equalizer 13, but it does not matter that the equalizer 13 is provided between the read amplifier 10 and the input selector 12 and between the read amplifier 11 and the input selector 12, respectively. In particular, when the wavelengths of the first laser 1 and the second laser 2 are different from each other, it is recommended to install the equalizer 13 between the read amplifiers 10 and 11 and the input selector 12, respectively.

A pulse signal outputted by the slicer 14 is inputted to a discriminator 16 and a PLL 15. Furthermore, a synchronizing signal (a signal synchronized with a fundamental period of a pulse signal) outputted from the PLL 15 is also inputted to the discriminator 16. In the discriminator 16, a detection code string is generated using the pulse signal and the synchronizing signal. The detection code string is inputted to an encoder 17, and a data bit string (information) is outputted. Further, the data bit string is also outputted to an address comparator or discrimator 18. A control signal 19 is also inputted to the address comparator 18. In the address comparator 18, an input selecting signal showing which one of the electric signal from the first light receiver 3 and the electric signal from the second light receiver 4 is to be selected is outputted to the input selector 12 using the data bit string and the control signal 19.

The first laser 1 is driven in accordance with an input data bit string (information). The input data bit string is formed into a writing code string by means of an encoder 7. A writing code string and the control signal 19 are inputted to an Automatic Power Control (APC) 6 for controlling a laser drive amplifier 5 which drives the first laser 1. Further, the control signal 19 is also inputted to the APC 9 for controlling the laser drive amplifier 8 for driving the second laser 2. Thus, it is possible to change respective optical outputs of the first laser 1 and the second laser 2 in accordance with the control signal 19.

Figure 2:
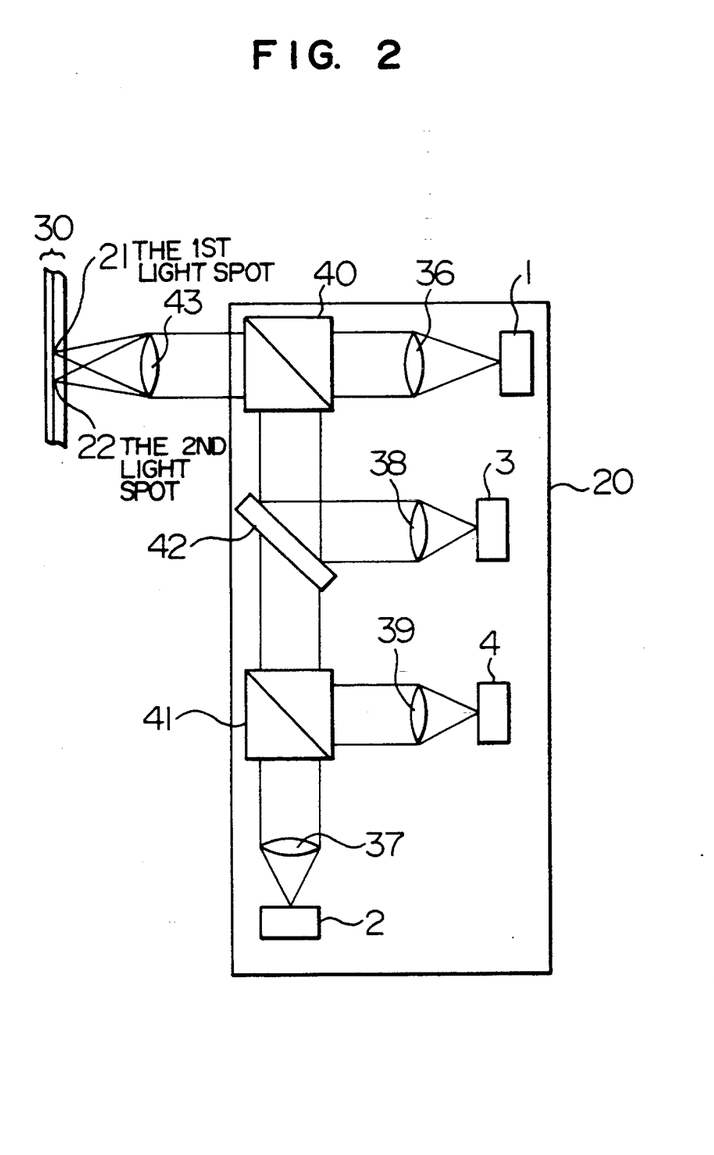
FIG. 2 is a partial block diagram of the present invention.

A concrete structural example of the optical head 20 is shown in FIG. 2. The optical head 20 has a function to squeeze the light emitted from the first laser and the second laser onto the storage medium 30. Namely, as shown in FIG. 2, the laser 1 composed of a semiconductor laser is made to emit light, which is formed into parallel rays by a collimator lens 36, passed through a prism 40, and made incident to an objective lens 43 so as to form the first light spot 21 on the storage medium 30. Next, the second laser 2 is made to emit light, which is formed into parallel rays by a collimator lens 37 and made incident to the prism 40. In the prism 40, the light from the second laser 2 is reflected and led to the objective lens 43, thus forming the second light spot 22 on the storage medium 30. Then, the first light spot 21 and the second light spot 22 irradiated onto the storage medium are reflected from the storage medium 30, and formed into parallel rays respectively by means of the objective lens 43. The reflected light of the first light spot 21 is reflected by the prism 40 and a dichroic mirror 42, passes through a lens 38, split with polarization by a beam splitter and the like (not shown), and received by the first light receiver 3 for detecting a light spot control signal such as a blooming signal and a track dislocation signal and an information signal such as an address information or writing information signal. On the other hand, the reflected light of the second light spot 22 is reflected by the prism 40, passes through the dichroic mirror 42, is reflected by a prism 41, passes through a lens 39, is split with polarization by means of a beam splitter and the like, and is received by a second light receiver 4 for detecting various signals in a similar manner to the case of the above-described first light spot 21.

Figure 3A:
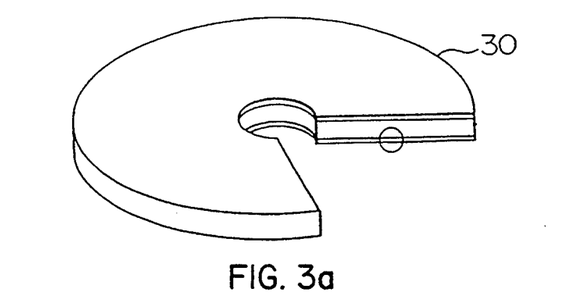
FIG. 3a is a general view of a storage medium.
Figure 3B:
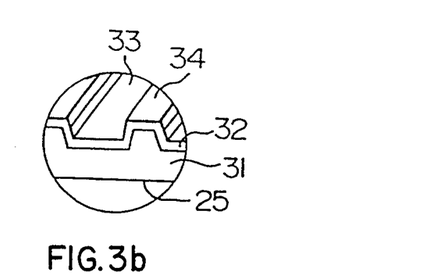
Figure 3C:
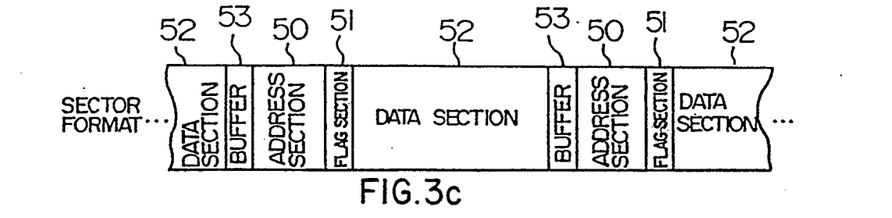
FIG. 3c illustrates sector format construction.

Next, input selecting operation for a read signal from the read amplifier 10 or 11 in the input selector 12 will be described. FIGS. 3a and 3b show an example of the storage medium 30, and FIG. 3c-3f shows the relationship between a sector format construction of the storage medium 30 and input selecting operation in the input selector 12.

The storage medium 30 has a disc shape having a concentric or spiral-shaped writing track. Further, the storage medium 30 has a groove for track positioning by the light spot from a light source. The groove closer to an incident surface 25 is referred to as a groove 33, and the groove farther therefrom is referred to as a land 34. A path covering 360° where information is written on a circumference on the storage medium 30 having a structure as described above is the writing track. The writing track is divided radially into a plurality of sectors. Each of the respective sectors has a sector format construction shown in FIG. 3c. The information is written on the land 34 or the groove 33 in a shape of a hole for instance by tracing the track by means of grooves for positioning the track.

Figure 3D:
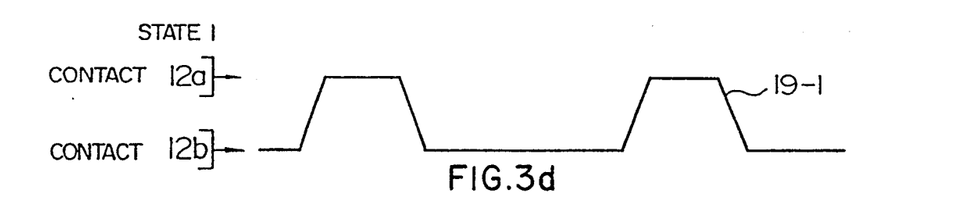
FIG. 3d illustrates one type of control signal indicating the input selecting operation in state 1.
Figure 3E:
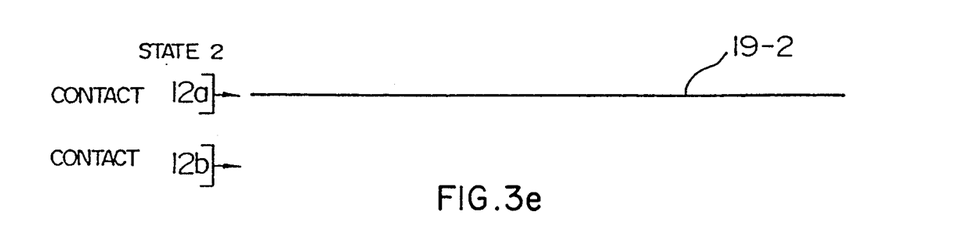
FIG. 3e illustrates one type of control signal indicating the input selecting operation in state 2.
Figure 3F:
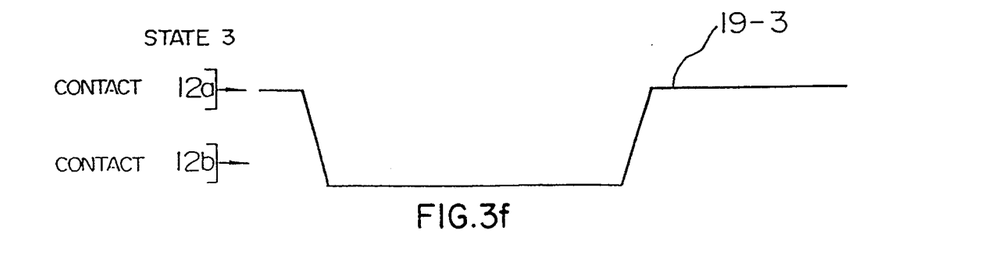
FIG. 3f illustrates one type of control signal indicating the input selecting operation in state 3.

In FIG. 3d-3f, three types of control signals 19 indicating the input selecting operation are shown. A control means 23 outputs a control signal 19-1 at the time of writing or erasing (state 1), a control signal 19-2 at the time of reading (state 2), and a control signal 19-3 at the time of the waiting (state 3). Selection processing of read signals obtained from the optical head 20 is shown by The corresponding sector format construction of the medium 30.

In the state 1, after the writing or erasing of information by means of the first laser 1 in accordance with the control signal 19-1, the written or erased portion is read so as to confirm the write or erase state. Therefore, the reading signal based on the second light spot 22 positioned in the rear of the first light spot with respect to the onward direction of the storage medium is led to a reading signal processing system. The selection by the input selector 12 is made for that purpose. As shown in the upper part of FIG. 3c, the sector constituting a track is composed of a prerecorded address section 50, a data section 52 where a user writes information, a flag section located in the rear of the address section 50 and a buffer 53 located in the rear of the data section 52. The state 1 means confirmation after writing information in the data section 52. Confirmation means an operation of reading information on the write or erase state of the information. Further, it is assumed that the writing process is made to correspond to the first laser 1 and the reading process to the second laser 2.

When the address section 50 is read, the output of the first laser 1 performing the writing process is controlled by the APC 6 using the control signal 19-1, and furthermore, the contact 12a on the side of the first light receiver is selected in order to read an electric signal obtained from the reflected light of the first laser. Here, the reason why the contact 12a is selected is that the writing process is executed in the data section 52 following to the address section 50 after the address section 50 is confirmed in advance by means of the first laser 1, which executes the writing process.

Figure 4:
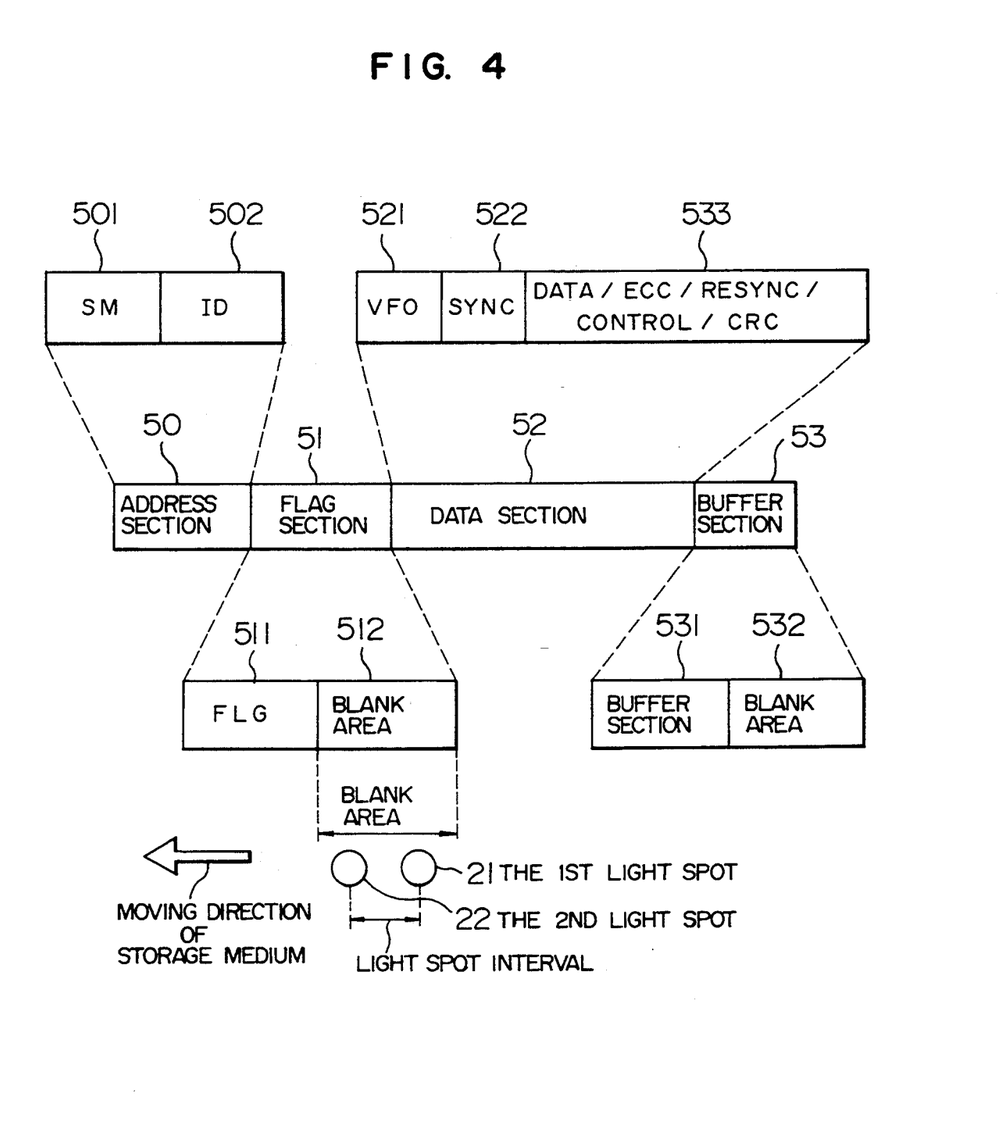
FIG. 4 is a block diagram showing a sector format of a storage medium used in the present invention.

Next, the contact is changed over to the contact 12b on the side of the second light receiver in the area of the flag section 51. FIG. 4 shows an example in which an area required for changing over of the contacts 12a and 12b is newly added in the flag section 51. The flag section 51 has FLG 511 and a blank area 512. FLG 511 shows such information as whether this sector is an already written block, a defective block, or an already deleted block. The blank area 512 is an area where processing of the two electric signals obtained from the two light spots irradiated onto the storage medium is selected. Namely, in the blank area 512, an input selecting operation of the input selector 12 which receives electric outputs based on two light spots is performed. During the input selecting process, reading of information including a confirming operation is not executed. Thus, the length of the blank area 512 is set at or longer than the light spot interval between the first light spot 21 and the second light spot 22. Accordingly, it is sufficient that the blank area 512 has a length equal to or longer than the light spot interval. Even if information is written in the blank area 512 by mistake, the information will never be read out. In other words, it does not matter whether information has been written or not, since the blank area 512 is an area where the information is not read. Since such an area is provided, even if the blank area 512 having the above-described spot interval is newly provided in the flag section 51, the capacity loss is in the order of several tens of bytes or less when it is assumed that the interval between two light spots is several tens of $\mu$m and the bit pitch is 0.5 $\mu$m/bit. Thus, no problem is created. (Capacity loss by a blank area 532 in a buffer 53 which will be described later is also taken into consideration.)

In the data section 52, the first laser 1 performs a writing process, and a reading process for confirmation is performed with the reflected light based on the second laser 2. Because the information is written with the first laser 1, it is very difficult to read the information out of the reflected light based on the first laser during writing of the information in the data section 52.

After the writing or erasing process in the data section 52, two light spots irradiate the buffer 53. The buffer 53 is composed of an area buffer section 531 for absorbing fluctuation of rotation and a blank area 532. The blank area 532 serves to permit input selecting processing of the input selector 12 which receives electric outputs based on two light spots and thus performs the duties of the blank area 512 in the flag section 51. Thus, the blank area 532 also has a length at and longer than the light spot interval between the first light spot 21 and the second light spot 22 with respect to the onward direction. Further, the structure of the blank area 532 may either include information or be a mirror surface. Thus, in the buffer 53, with the contact 12a on the side of the first light receiver obtained from the first laser 1, the writing process is performed so as to read the address section 50.

As described above, two signals are selected to be inputted to the signal processing system for reading the information in order to confirm the write state or the erase state of the information. Therefore, it is possible to perform reading for confirmation immediately after writing the information even if there is only one signal processing system. Further, since it is possible to write the information after confirming the position of the writing spot, it is possible to surely prevent data destruction and the like of another data section by means of writing.

In the state 2, the contacts 12a and 12b of the input selector 12 are selected in accordance with the control signal 19-2 in order to read the already written information. Namely, in the input selector 12, the contact 12a on the side of the first light receiver is selected, and input selection is not made until the process state changes.

The state 3 is a waiting state for moving to the next process (writing process, erasing process and reading process), and the contacts 12a and 12b of the input selector 12 are selected in accordance with the control signal 19-3. For example, the contact 12a on the side of the first light receiver and the contact 12b on the side of the second light receiver are selected alternately for each sector. This is a suitable arrangement for making the lifetime of the apparatus and the medium longer and for reducing the power consumption thereof in case the waiting process is continued for many hours.

A sector format construction of the storage medium will be described partially. The address section 50 expresses physical addresses of sectors on a disc, and is composed of SM 501 and ID 502. SM 501 shows the head of the sector format, and track numbers and a sector numbers are written in ID 502. The data section 52 is an area where data required by a user are written, and is composed of VFO 521 having a continuous repetitive pattern so as to make it possible to surely read the data even if there is fluctuation in rotation of the disc, SYNC 522 which is a synchronizing signal of the data section 52, DATA which is an area where a user writes data, CONTROL for writing-(defect processing) into another sector (relief sector) when there is a defect in the sector to be written originally, ECC or CRC which is a redundancy word for error correction and detection and 523 [DATA/ECC/RESYNC/CONTROL/CRC] composed of RESYNC having a code pattern for synchronization for preventing errors of data from spreading widely.

Figure 5:
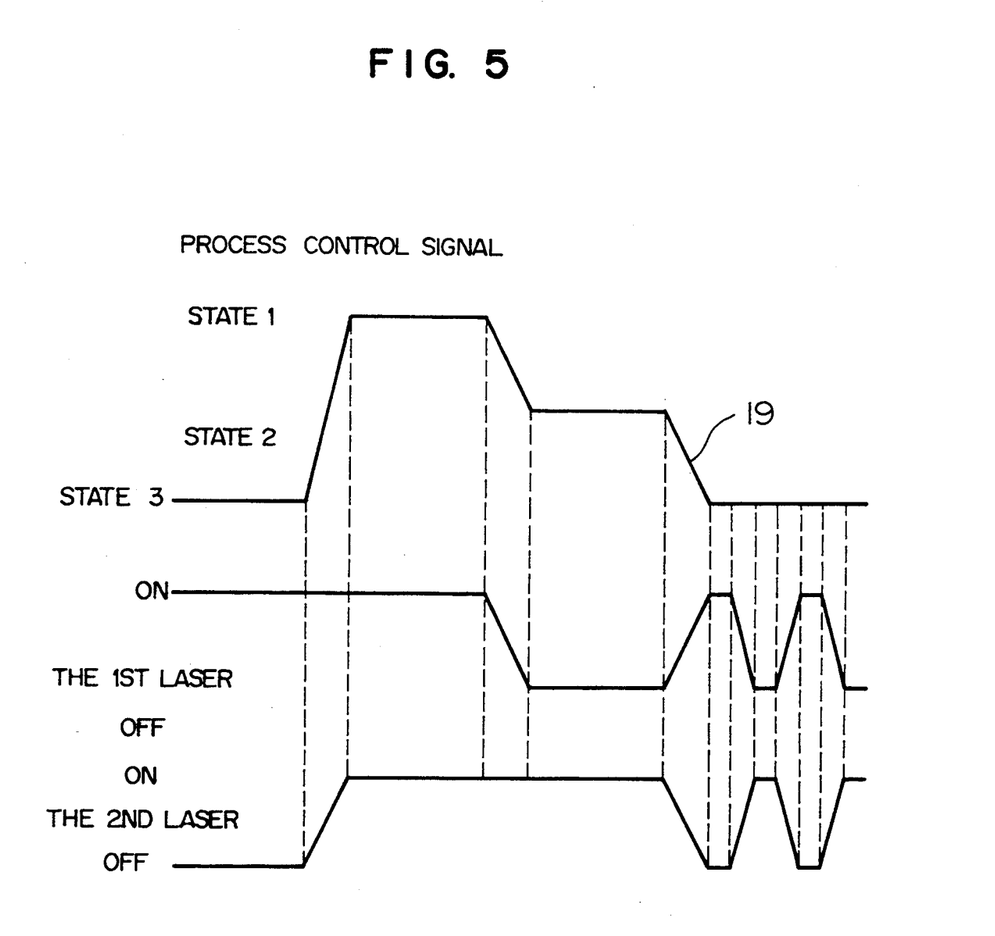
FIG. 5 is a time chart diagram showing an example of the relationship between a process control signal and laser drive.

Next, an embodiment related to a method for driving a laser for making the lifetime of the apparatus and the medium longer and for reducing the power consumption thereof will be described. FIG. 5 shows the relationship between the process control signal and laser driving. The process states (states 1 to 3) shown in the upper part of FIG. 5 are similar to process states (states 1 to 3) described with reference to FIG. 3. The driving states of the first laser 1 and the second laser 2 are shown while having these states correspond to the change of the process state. With the control signal 19-3 in the state 3, the first laser 1 is driven and the second laser 2 is suspended. (The first laser 1 and the second laser 2 may also be put on/off alternately.) In this case, the input selector 12 operates to select the input as described with respect to the control signal 19-2 shown in FIG. 3.

Next, when the state 3 changes to the state 1, both the first laser 1 and the second laser 2 are driven. In this case, the input selector 12 operates to select the input as described with reference to the state 1 shown in FIG. 2. When the state 1 is changed into the state 2, the first laser 1 is suspended, and the second laser 2 is driven as it is. (Otherwise, the first laser 1 may be driven and the second laser 2 may be suspended.)

When the state 2 is changed into the state 3, the first laser 1 and the second laser 2 are driven and suspended alternately. The operation of the input selector 12 in this case is performed almost similarly to the input selection described with respect to the state 3 shown in FIG. 2. Furthermore, input selection is made by synchronizing with alternate driving of the lasers. With this, since the first light spot 21 and the second light spot 22 can read the address section alternately, it is possible to recognize mutual positional relationship between the first light spot 21 and the second light spot 22. It is also possible to eliminate positional dislocation of the light spot by feeding back the positional relationship to a light spot control system by some means or other.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

For example, when a plurality of light spots are arranged on the storage medium and a plurality of electric signals corresponding to the reflected light are obtained, similar functions and effects to what has been described above are obtainable.

According to the present invention, processing systems for converting into information smaller in number than a plurality of means for writing and reading can be realized. Therefore, there is an effect that miniaturization of an apparatus for writing and reading information can be achieved.

Further, since alternate driving and suspension of a plurality of means for writing and reading can be realized, there is an effect that low power consumption can be achieved.

Furthermore, since positional dislocation of the light spot can be eliminated, it is possible to secure reliability in writing and reading of information.

We claim:

1. An apparatus for writing and reading information comprising:
   an optical head composed of a light source, an optical system in which a light beam emitted from said light source is shaped so as to irradiate a plurality of light spots onto a unidirectional rotating storage medium, and a plurality of detectors for detecting and outputting electric signals which correspond to each of said plurality of light spots;
   signal reading means for receiving said plurality of electric signals and for reading and outputting electric signals smaller in number than said plurality of electric signals; and
   control means connected to said optical head and said signal reading means for outputting a control signal to said optical head and said signal reading means, respectively, such that after detection of predetermined information recorded on said storage medium by inputting the electric signals corresponding to one of said light spots into said signal reading means, said electric signals corresponding to another of said light spots succeeding said one light spot are input to said signal reading means.

2. An apparatus for writing and reading information according to claim 1, wherein said signal reading means has selecting means for selecting said plurality of electric signals.

3. An apparatus for writing and reading information comprising:

an optical head composed of a light source, an optical system in which a light beam emitted from said light source is shaped so as to irradiate a plurality of light spots onto a storage medium, and a plurality of detectors for detecting and outputting electric signals which correspond to each of said plurality of light spots;

signal reading means for receiving said plurality of electric signals and for reading and outputting electric signals smaller in number than said plurality of electric signals; and control means connected to said optical head and said signal reading means and for outputting a control signal to said optical head and said signal reading means, respectively, such that after detection of predetermined information recorded on said storage medium, said plurality of electric signals are switched to be inputted to said signal reading means;

wherein said signal reading means has selecting means for selecting said plurality of electric signals; and wherein said control signal controls the light source of said optical head through means for controlling the output of said light source, and also controls said selecting means.

4. An apparatus for writing and reading information according to claim 3, wherein said storage medium has at least two blank areas in one sector, and the length of each of said respective blank areas in a moving direction has at least an interval among said plurality of light spots.

5. An apparatus for writing and reading information according to claim 4, wherein said selecting means is changed over when said plurality of light spots are irradiating said blank areas.

6. An apparatus for writing and reading information comprising:

an optical head including a light source, an optical system for shaping a light beam emitted from said light source and irradiating a plurality of light spots onto a unidirectional rotating storage medium and means for outputting a plurality of electric signals corresponding to said plurality of light spots;

signal reading means for receiving said plurality of electric signals and for reading and outputting electric signals smaller in number than said plurality of light spots; and control means connected to said optical head and said signal reading means for outputting a control signal to said optical head and said signal reading means, respectively such that after detection of predetermined information recorded on said storage medium by inputting the electric signals corresponding to one of said light spots into said signal reading means, said electric signals corresponding to another of said light spots succeeding said one light spot are input to said signal reading means.

7. An apparatus for writing and reading information according to claim 6, wherein said signal reading means has selecting means for selecting said plurality of electric signals.

8. An apparatus for writing and reading information comprising:

an optical head including a light source, an optical system for shaping a light beam emitted from said light source and irradiating a plurality of light spots onto a storage medium and means for outputting a plurality of electric signals corresponding to said plurality of light spots;

signal reading means for receiving said plurality of electric signals and for reading and outputting electric signals smaller in number than said plurality of light spots;

control means connected to said optical head and said signal reading means and for outputting a control signal to said optical head and said signal reading means, respectively, such that after detection of predetermined information recorded on said storage medium, said plurality of electric signals are switched to be inputted to said signal reading means;

wherein said signal reading means has selecting means for selecting said plurality of electric signals; and wherein said control signal controls the light source of said optical head through means for controlling the output of said light source and controls said selecting means.

9. An apparatus for writing and reading information according to claim 8, wherein said storage medium has at least two blank areas in one sector, and the length in the moving direction of each of said blank areas has at least an interval among said plurality of light spots.

10. An apparatus for writing and reading information according to claim 9, wherein said selecting means is changed over when said plurality of light spots are irradiating said blank areas.

11. A method for writing and reading information comprising the steps of:

shaping a light beam emitted from a light source and irradiating a plurality of light spots onto a storage medium;

outputting a plurality of electric signals corresponding to each of said plurality of light spots;

receiving said plurality of electric signals, reading and outputting electric signals smaller in number than said electric signals; said reading including reading said plurality of electric signals by switching them for each sector of said storage medium after detection of predetermined information recorded on said storage medium;

wherein said plurality of electric signals are selected by selecting said read and output electric signals by a control signal; and wherein said control signal controls the light source of an optical head including controlling an output of said light source, and controlling said selecting. trolling said selecting.

12. A method for writing and reading information according to claim 11, wherein said storage medium has at least two blank areas in one sector, and the length in a moving direction of each of said respective blank areas has an interval among said plurality of light spots.

13. A method for writing and reading information according to claim 12, wherein said outputted signal is selected when said plurality of light spots are irradiating said blank areas.

14. A method of using a storage medium in an apparatus for writing and reading information by irradiating a first light spot by means of a first optical head so as to write information, obtaining a first detected signal based on said first light spot, obtaining a second detected signal based on a second light spot by irradiating the second light spot by means of a second optical head, and selecting and reading either said first detected signal or said second detected signal, characterized in that a sector format having a blank area with a length at least equivalent to or longer than an arrangement interval between said first light spot and said second light spot is provided, and said selection is made when said first light spot and said second light spot are irradiating said blank area.

15. A method of using a storage medium in an apparatus for writing and reading information for obtaining first and second detected signals corresponding to a first light spot and a second light spot, by respectively irradiating said first light spot and said second light spot onto a storage area of the storage medium and selecting and reading one of said first and second detected signals, wherein a sector format having a blank area with a length at least equivalent to an arrangement interval between said first light spot and said second light spot is provided, and wherein said selecting is made when said first light-spot and said second light spot are irradiating said blank area.

16. A method for reproducing information on an optical disk medium, comprising the steps of:
   preparing a pair of a header section and a data section on the optical disk;
   irradiating two light beams on the optical medium so as to form two light spots on the optical disk;
   detecting two light spots on the optical disk and respectively generating two signals therefrom;
   selecting one of the signals from the two signals on the basis of whether the two light beams irradiate the header section or the data section on the optical disk; and
   reproducing information based on the selected signal.

17. A method for reproducing information according to claim 16, further comprising the steps of:
   providing a blank section between the header and data sections; and
   performing said selecting at a period of said blank section.

* * * * *